No. 612,584. Patented Oct. 18, 1898.
F. C. FERRIS.
MIXING MACHINE.
(Application filed Oct. 13, 1897.)
(No Model.)

WITNESSES:
J. N. Fravel
A. L. Phelps

INVENTOR
Frank C. Ferris
BY
C. C. Shepherd
ATTORNEY

THE NORRIS PETERS CO., PHOTO-LITHO., WASHINGTON, D. C.

UNITED STATES PATENT OFFICE.

FRANK C. FERRIS, OF COLUMBUS, OHIO.

MIXING-MACHINE.

SPECIFICATION forming part of Letters Patent No. 612,584, dated October 18, 1898.

Application filed October 13, 1897. Serial No. 655,043. (No model.)

*To all whom it may concern:*

Be it known that I, FRANK C. FERRIS, a citizen of the United States, residing at Columbus, in the county of Franklin and State of Ohio, have invented a certain new and useful Improvement in Mixing-Machines, of which the following is a specification.

My invention relates to the improvement of machines for mixing mortar or other compositions of matter; and the objects of my invention are to provide a machine of this class of improved construction and arrangement of parts which will greatly facilitate the production of a thorough agitation and mixing of the matter contained in the mixing-receptacle, to provide improved means for imparting rotary motion to the mixers and agitators, and to produce other improvements in details of construction and arrangement of parts, which will be more fully pointed out hereinafter. These objects I accomplish in the manner illustrated in the accompanying drawings, in which—

Figure 1:
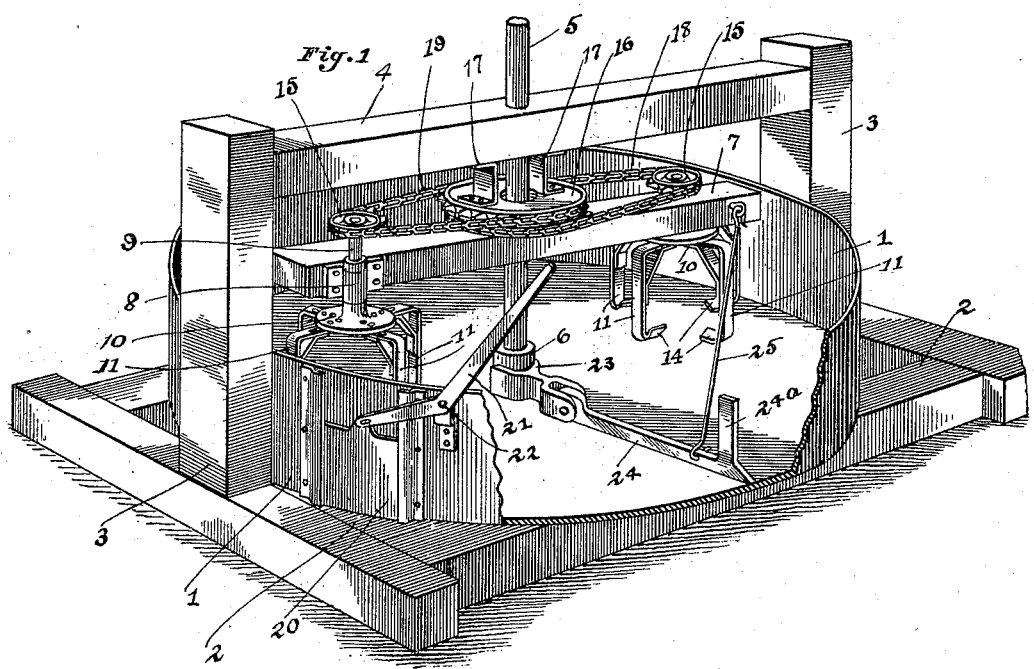
Figure 2:
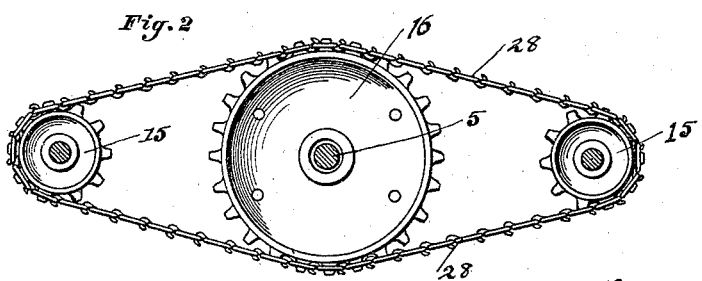
Figure 3:
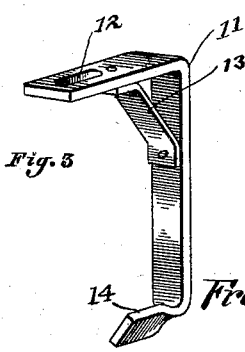

Figure 1 is a view in perspective of my improved machine, showing a portion of the mortar pan or receptacle broken away for the sake of clearness in illustration. Fig. 2 is a plan view of a modified form of gearing from that shown in Fig. 1, and Fig. 3 is a detail view in perspective of one of the mixing or agitating arms.

Similar numerals refer to similar parts throughout the several views.

1 represents a suitable cylindrical receptacle or pan which is supported on a desirable form of fixed base or framework 2. Rising from opposite sides of this base-framework are frame-standards 3, which are connected in their upper portions by a transverse frame-beam 4.

5 represents a vertical shaft, which passes through and is journaled in the central portion of the beam 4, the lower end portion of said shaft being rotatably supported in a suitable socket projection 6 in the center of the pan 1. This vertical shaft 5, at a point below the beam 4, has mounted thereon the central portion of a transverse mixer-carrying bar 7. Near its outer end portions this bar is provided with vertical boxing-brackets 8, in each of which is journaled a short vertical shaft or stem 9 of a depending mixer 10. From the disk which forms the lower end of each of the shafts 9 depend mixing and agitating arms 11, the body of each of these arms being angular and the upper horizontal portion thereof being adjustably connected with the under side of the disk termination of said shaft or stem through the medium of bolts which depend from said disk and are adapted to pass through slotted openings 12 in said upper horizontal portion of the arm. The upper horizontal and vertical portions of each of the arms 11 are preferably connected by an inclined brace-bar 13. The lower end of each of the vertical arm portions is provided with an inturned finger 14, which, as indicated in the drawings, is by means of a partial twist converted into an inclined scraper, this construction being shown more clearly in Fig. 3 of the drawings. The upper horizontal portions of the arms 11 are, as indicated in the drawings, arranged to project radially at suitable intervals from the disk termination of the shaft or stem 9. On the upper end of each of said shafts or stems 9 is carried a comparatively small sprocket-wheel 15.

Beneath the frame-beam 4 and above the bar 7 I provide a sprocket-wheel 16, the periphery of which is preferably provided with an upper and lower circular row of sprocket-teeth. Said wheel may, however, be formed of two separate sprocket-wheels the adjoining faces of which are connected one with the other. The double sprocket-wheel thus formed is, through the medium of suitable brackets or hangers 17, supported from the under side of the frame-beam 4, the shaft 5 passing loosely through a central opening in said sprocket-wheel. 18 represents an endless chain belt which passes about the lower set of sprocket-teeth of the wheel 16 and about one of the smaller sprocket-wheels 15. 19 represents a second chain belt which, passing about and engaging with the upper set of sprocket-teeth of the wheel 16, passes outward and about the remaining sprocket-wheel 15.

At a suitable point in the side wall of the pan or receptacle 1 I provide a doorway or opening which is adapted to be normally closed by a vertically-sliding door-plate 20, the upper side of which is fulcrumed to one end of an angular operating-lever 21, the latter being fulcrumed at the junction of its arms to the pan-body or a projection thereon, as indicated at 22.

Partially embracing the vertical socket projection 6 at the center of the pan is the yoke termination of a short arm 23, to which is fulcrumed an outwardly-extending scraper-bar 24, the lower edge of the latter normally bearing on the bottom of the pan and the outer and inclined end thereof terminating adjacent to the inner side of the said pan-wall. This outer end portion of the bar 24 is preferably provided with an upwardly-extending arm 24$^a$. The bar 24 is connected with one end of the mixer-carrying bar 7 through the medium of a rod 25, which is detachably hooked or otherwise engaged with said bar 7.

In utilizing my device the ingredients or composition to be mixed are first introduced into the pan, after which rotary motion is suitably imparted to the shaft 5. Through this rotary motion of the shaft 5 and the consequent movement of the bar 7 the depending mixers 10 are carried in a circular path about the interior of the pan, and owing to the fact that the sprocket-wheels 15 have chain-gear connections with the sprocket-teeth of the wheel 16 it is obvious that the circular traveling movement, above described, of the mixers must result in the links of said sprocket-chains successively engaging with the teeth of said central wheel 16 and in the consequent rotation of the smaller sprocket-wheels 15 and the shafts or stems 9, thereby imparting to the depending mixers a constant rotation, as well as the traveling movement hereinbefore described. As will readily be seen, the circular traveling and rotary movements of the mixing-arms must result in such engagement with and agitation of the mass contained in the pan as to operate to thoroughly mix and combine the ingredients of such mass.

When the material contained in the pan is ready to be discharged therefrom, the door-plate 20 may be elevated by a depression of the lever-handle 21, thus providing an opening in the pan-wall through which the material may be forced by the action of the bar 24, which, owing to its connection with the bar 7, also travels in a circular path about the interior of the pan. In order to detach the bar 24 from the machine or elevate the same to an inclined position, it is obvious that it is first necessary to disconnect the rod 25 from the bar 7.

As indicated in Fig. 2 of the drawings, I may provide the central wheel 16 with but one set of sprocket-teeth and substitute for the sprocket-chains 18 and 19 a single endless chain 28, the latter engaging with opposite sides of said wheel 16 and passing about the wheels 15. It is also evident that I may omit one of the mixers 10, if desired, and cause to depend from the bar 7 other suitable mixing and agitating projections. It will be observed that the various motions imparted to the mixers in the manner hereinbefore described will be of great utility in producing the desired agitation and combination of ingredients and that the inclined fingers 14 of the mixer-bars will serve to scrape from the lower portion of the pan any of the material which might otherwise cling thereto.

In case it should be necessary I may provide a suitable casing for that portion of the shaft which is within the pan to prevent the mixture entering and affecting the bearings of said shaft.

Attention is called to the fact that although the central sprocket-wheel 16 is rigidly connected with the framework of the machine and is therefore non-rotating the engagement of the sprocket-chains therewith serves to produce a desirable rotation of the smaller sprocket-wheels 15.

It will be observed that the construction and operation of my improved machine is simple and that the same may be produced at a reasonable cost of manufacture.

While this machine is primarily intended for the mixing of mortar and similar compositions, it is obvious that the same may be employed for mixing matter or ingredients of any character, whether in a dry or plastic state.

Having now fully described my invention, what I claim, and desire to secure by Letters Patent, is—

1. In a mixing-machine the combination with a framework, a central shaft 5 journaled in said framework, a bar 7 carried on said shaft, a mixing-pan, a rotary mixer-carrying shaft journaled in said bar 7 and depending within said pan, of a fixed sprocket-wheel surrounding said central shaft and having an upper and lower set of sprocket-teeth, smaller sprocket-wheels on said mixer-carrying shaft, and endless chains 18 and 19 respectively connecting said smaller sprocket-wheels with the lower and upper teeth of said central sprocket-wheel, substantially as and for the purpose specified.

2. In a mixing-machine, the combination with the pan, a central socket projection in said pan, and a suitable framework, a rotatable vertical shaft journaled in said framework and pan, a transverse bar 7 carried on said shaft, mixer stems or shafts journaled on opposite sides of the center of said bar 7, and radially-arranged mixing-arms connected with each of said mixer-shafts, said arms being provided with inturned finger portions 14, sprocket-wheels carried on said mixer-shafts, and a scraper-arm having its outer end portion detachably connected with the bar 7 and having its inner end portion detachably journaled on the central shaft-receiving socket projection of the pan, of a stationary sprocket-wheel supported between said mixer-sprockets, and a chain-gear connection between said mixer-sprockets and stationary sprocket-wheel, substantially as and for the purpose specified.

FRANK C. FERRIS.

In presence of—
 C. C. SHEPHERD,
 A. L. PHELPS.